(12) United States Patent
Fan et al.

(10) Patent No.: US 12,285,145 B2
(45) Date of Patent: Apr. 29, 2025

(54) DISHWASHING DEVICE

(71) Applicants: Guangdong Midea White Home Appliance Technology Innovation Center Co., Ltd., Foshan (CN); Foshan Shunde Midea Washing Appliances Mfg. Co., Ltd., Foshan (CN); Midea Group Co., Ltd., Foshan (CN)

(72) Inventors: Yanfeng Fan, Foshan (CN); Weijun Xue, Foshan (CN)

(73) Assignees: GUANGDONG MIDEA WHITE HOME APPLIANCE TECHNOLOGY INNOVATION CENTER CO., LTD., Foshan (CN); FOSHAN SHUNDE MIDEA WASHING APPLIANCES MFG. CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 268 days.

(21) Appl. No.: 18/089,346

(22) Filed: Dec. 27, 2022

(65) Prior Publication Data
US 2023/0136135 A1    May 4, 2023

Related U.S. Application Data

(63) Continuation of application No. PCT/CN2020/108164, filed on Aug. 10, 2020.

(51) Int. Cl.
A47L 15/42    (2006.01)
(52) U.S. Cl.
CPC ....... *A47L 15/4285* (2013.01); *A47L 15/4214* (2013.01); *A47L 15/4246* (2013.01); *A47L 15/4291* (2013.01); *Y02B 40/00* (2013.01)

(58) Field of Classification Search
None
See application file for complete search history.

(56) References Cited

U.S. PATENT DOCUMENTS

2009/0250085 A1* 10/2009 Gaus ............... A47L 15/485
165/95

FOREIGN PATENT DOCUMENTS

CN    103415750 A    11/2013
CN    105476584 A    4/2016
(Continued)

OTHER PUBLICATIONS

Malcolm Lapera, "Design of Controlled Environment for Tissue Engineering", Feb. 14, 2014, XP055567012, 155 pgs., Retrieved from the Internet: https://digitalcommons.calpoly.edu/cgi/viewcontent.cgi?article=2243 &context=theses.
(Continued)

*Primary Examiner* — Levon J Shahinian
(74) *Attorney, Agent, or Firm* — Morgan, Lewis & Bockius LLP

(57) ABSTRACT

A dish washing device includes an inner compartment and a water collection cup arranged at a bottom part of the inner compartment, a wash pump and a heating apparatus are arranged on the water collection cup and/or a first water supply pipeline. The wash pump is used for pumping washing water inside the water collection cup to the inner compartment via the first water supply pipeline, and the heating apparatus is used for selectively heating the washing water. The heating apparatus includes a thermoelectric cooler used for heating the washing water. In comparison to heating washing water using an electric heater, thermoelectric cooler may save a large amount of power, thereby reducing the power consumption of the dishwashing device, and facilitating energy conservation and eco-friendliness.

11 Claims, 17 Drawing Sheets

(56) References Cited

FOREIGN PATENT DOCUMENTS

| | | |
|---|---|---|
| CN | 106618433 A | 5/2017 |
| CN | 208625640 U | 3/2019 |
| CN | 106618433 B | 5/2019 |
| CN | 211066474 U | 7/2020 |
| DE | 102009045547 A1 | 4/2011 |
| DE | 102013216741 B3 | 12/2014 |
| JP | 2020114526 A | 7/2020 |

OTHER PUBLICATIONS

Midea Group Co., Ltd., Extended European Search Report, EP20948930.1, May 25, 2023, 10 pgs.
Midea Group Co., Ltd., ISRWO, PCT/CN2020/108164, May 13, 2021, 6 pgs.
Midea Group Co., Ltd., IPRP, PCT/CN2020/108164, Feb. 7, 2023, 5 pgs.

* cited by examiner

DISHWASHING DEVICE

CROSS REFERENCE

The present disclosure is a continuation application of International (PCT) Patent Application No. PCT/CN2020/108164, filed on Aug. 10, 2020, the entire content of which is incorporated herein by reference in its entirety.

TECHNICAL FIELD

The present disclosure relates to the technical field of kitchen appliances, in particular to a tableware washing device.

BACKGROUND

In recent years, the consumers are increasingly concerning about whether consumable products are energy-saving, environment-friendly and low-carbon. The energy consumption values of kitchen appliance products are correspondingly decreasing. How to reduce the power consumption has also become an important issue. The power consumption of a dishwasher or a dish-washing machine mainly happens in a heating stage of a washing pump.

Power consumption is generally reduced by reducing a temperature of washing water. But when the temperature of the washing water is too low, the dishes may not be cleaned completely, especially stubborn oil stains may not be cleaned, which may eventually result in an expected cleaning effect not being achieved.

SUMMARY

The present disclosure provides a tableware washing device that may reduce the power consumption of a dish washer.

In some embodiments, a tableware washing device includes an inner liner, a water collection cup and a heating apparatus. The inner liner is configured to define a washing cavity for accommodating a tableware to be washed. The water collection cup is provided at a bottom of the inner liner, and configured to define a water collection cavity. The water collection cavity is configured to collect washing water that flows from the washing cavity. The water collection cavity is communicated to the washing cavity via a first water supply pipeline. A washing pump is provided on the water collection cup and/or the first water supply pipeline. The washing pump is configured to pump the washing water in the water collection cavity to the washing cavity through the first water supply pipeline. The heating apparatus is configured to selectively heat the washing water. The heating apparatus includes a semiconductor cooler. The semiconductor cooler is configured to perform a primary heating on the washing water.

The tableware washing device includes the inner liner and the water collection cup. The water collection cup is provided at the bottom of the inner liner. The first water supply pipeline is provided to send the washing water in the water collection cup to the inner liner. The washing pump and the heating apparatus are provided on the water collection cup and/or the first water supply pipeline. The heating apparatus includes the semiconductor cooler. The semiconductor cooler is configured to perform the primary heating on the washing water. Compared with heating the washing water through an electric heater, in the present disclosure, heating through the semiconductor cooler may save a large amount of electricity. In this way, the power consumption of the tableware washing device may be reduced, which is conducive to energy conservation and environmental protection.

BRIEF DESCRIPTION OF THE DRAWINGS

In order to more clearly illustrate technical solutions in embodiments of the present disclosure, the drawings required in the description of the embodiments will be briefly introduced below. Obviously, the drawings in the following description are only some embodiments of the present disclosure. For those of ordinary skills in the art, other drawings could be obtained based on these drawings without creative efforts.

DETAILED DESCRIPTION

The following will be a clear and through description of the technical solutions in the embodiments of the present disclosure in conjunction with the accompanying drawings in the embodiments of the present invention. It is clear that, the described embodiments are only some parts of the embodiments of the present invention, not all of them. Based on the embodiments of the present disclosure, all other embodiments obtained by a person of ordinary skill in the art without creative efforts would fall within the protection scope of the present disclosure.

The terms "first" and "second" in the present disclosure are used for descriptive purposes only, and should not be construed as indicating or implying relative importance or implicitly specifying the number of technical features indicated. In the description of the present disclosure, "a plurality of" means at least two, such as two, three, etc., unless otherwise expressly and specifically limited. In addition, the terms "include", "have" and any variations thereof, are intended to cover a non-exclusive inclusion. For example, a process, a method, a system, a product or a device including a series of operations or units are not limited to the listed operations or units, but optionally further include operations or units that are not listed, or optionally further include other operations or units that are inherent to the process, method, product or device. The term "and/or" is merely an associating relationship for describing associated objects, and indicates that there could be three relationships between the associated objects. For example, A and/or B may represent three situations: only A exists, A and B exist simultaneously, and only B exists. In the present disclosure, the character "/" generally indicates an "OR" relationship between the associated objects before and after the character "/".

Figure 1:
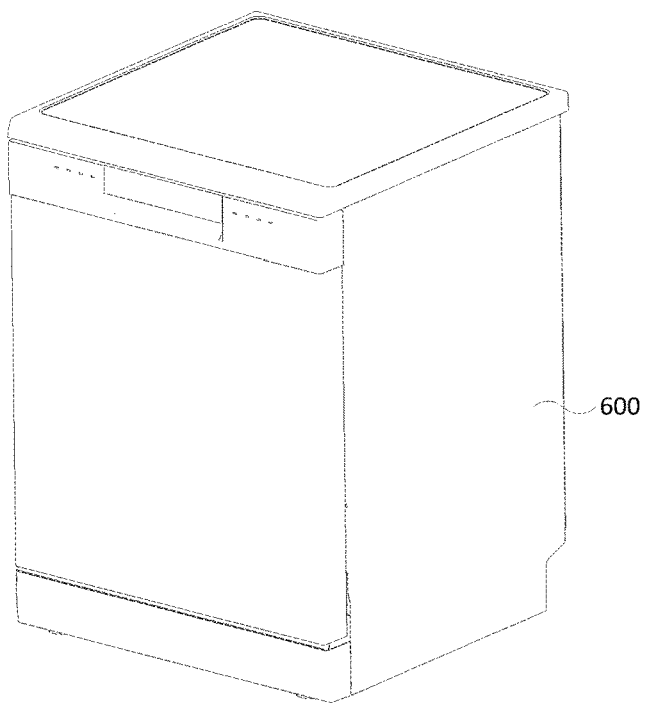
FIG. 1 is a schematic three-dimensional structural diagram of a tableware washing device according to an embodiment of the present disclosure.
Figure 2:
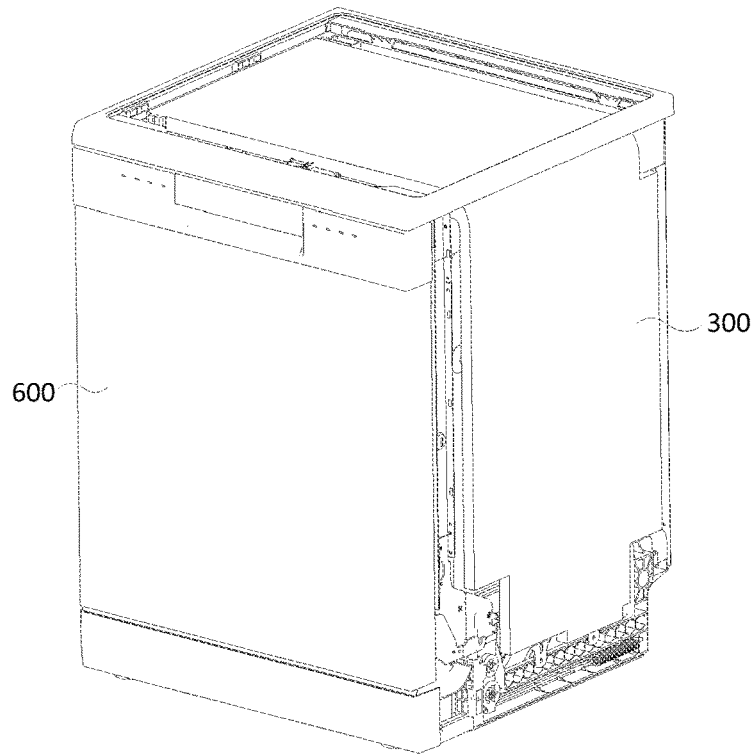
FIG. 2 is a schematic partial three-dimensional structural diagram of a tableware washing device according to an embodiment of the present disclosure.
Figure 3:
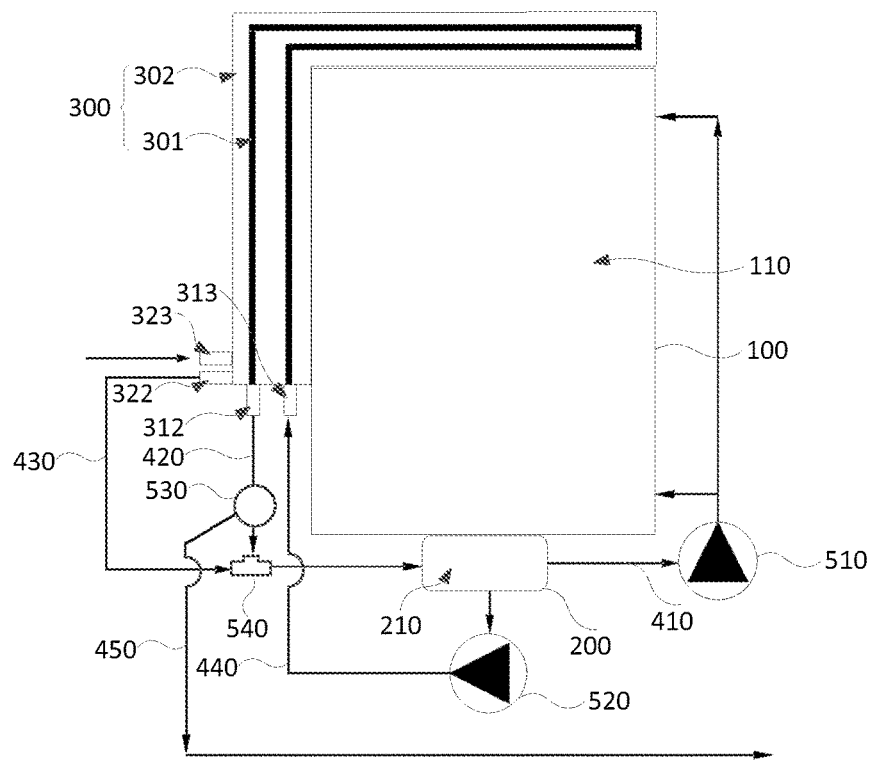
FIG. 3 is a schematic structural diagram of a tableware washing device according to an embodiment of the present disclosure.
Figure 4:
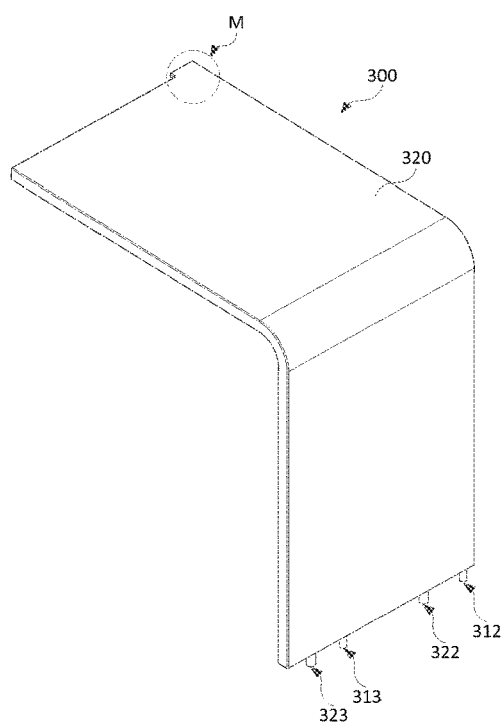
FIG. 4 is a schematic three-dimensional structural diagram of a water tank of a tableware washing device according to an embodiment of the present disclosure.
Figure 5:
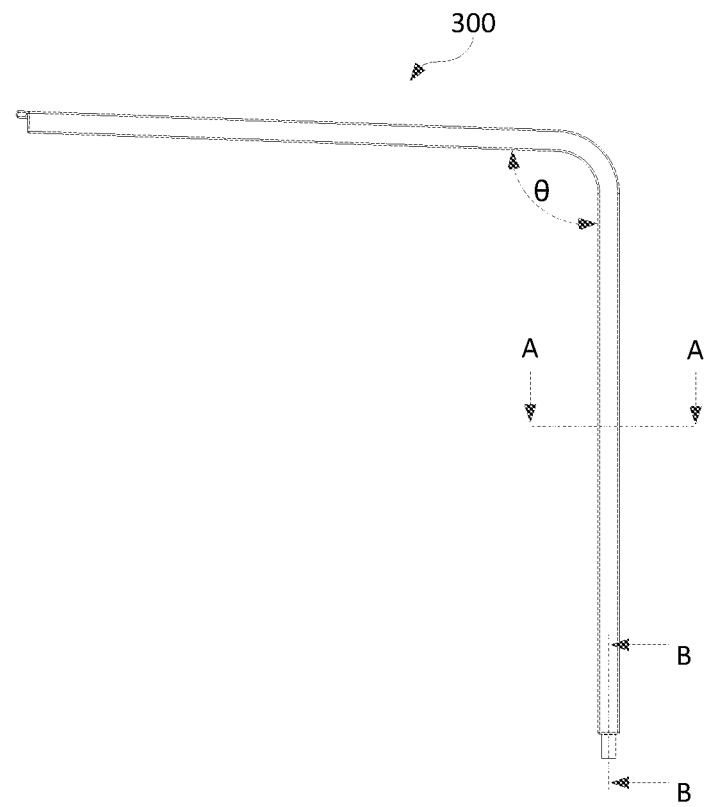
FIG. 5 is a schematic structural side view of a water tank of a tableware washing device according to an embodiment of the present disclosure.
Figure 6:
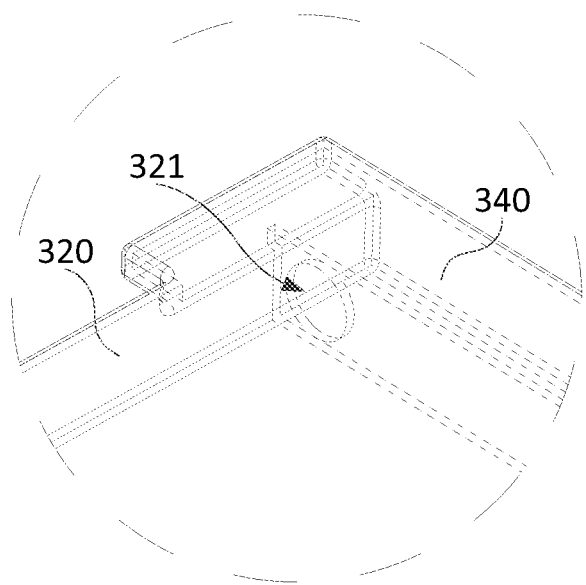
FIG. 6 is a partial perspective schematic structural diagram of the circle M of an embodiment of the tableware washing device of FIG. 4.
Figure 7:
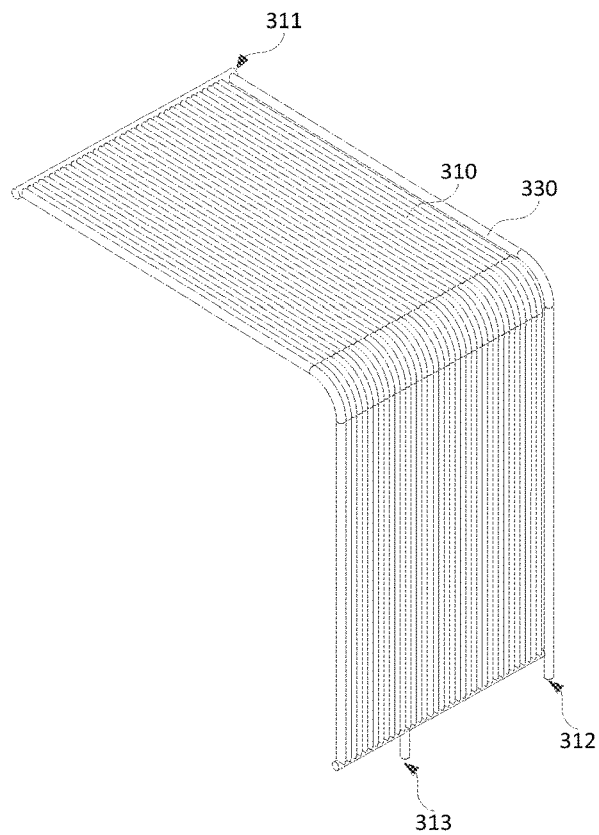
FIG. 7 is a schematic three-dimensional structural diagram of a first sub water tank of a tableware washing device according to an embodiment of the present disclosure.
Figure 8:
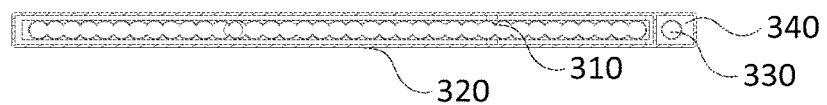
FIG. 8 is a schematic sectional structural diagram along a direction A-A of an embodiment of the tableware washing device in FIG. 5.
Figure 9:
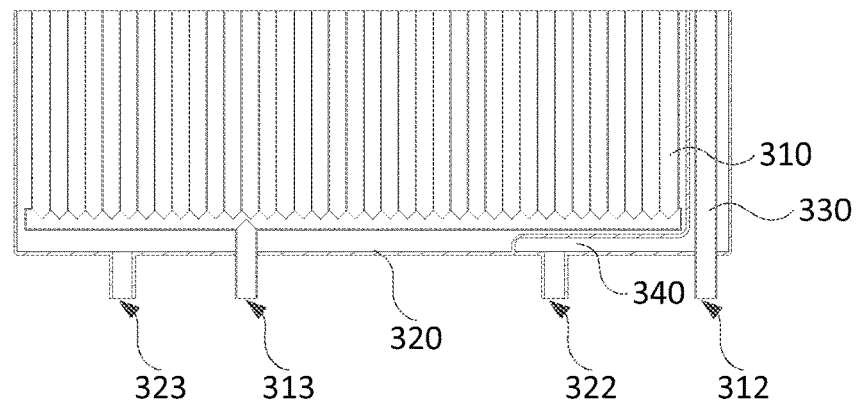
FIG. 9 is a schematic partial sectional structural diagram along a direction B-B of an embodiment of the tableware washing device in FIG. 5.

As shown in FIGS. 1 to 3, a tableware washing device 10 according to an embodiment of the present disclosure includes an inner liner 100, a water collection cup 200. The inner liner 100 is configured to define a washing chamber 110 for accommodating tableware to be washed. The water collection cup 200 is provided at a bottom of the inner liner 100, and is configured to define a water collection cavity 210. The water collection cavity 210 is configured to collect washing water flowing from the washing cavity 110. The water collection cavity 210 is communicated to the washing cavity 110 via a first water supply pipeline 410. A washing pump 510 is provided on the water collection cup 200 and/or the first water supply pipeline 410, and configured to pump the washing water in the water collection cavity 210 to the washing cavity 110 via the first water supply pipeline 410. A heating apparatus (not shown in the figures) is provided on the water collection cup 200 and/or the first water supply pipeline 410 and/or the washing pump 510. The heating apparatus is configured to selectively heat the washing water. The water tank 300 is configured to define a first water storage cavity 301 and a second water storage cavity 302. The first water storage cavity 301 is communicated to the water collection cavity 210 via a second water supply pipeline 420. The second water storage cavity 302 is communicated to the water collection cavity 210 via a third water supply pipeline 430. The first water storage cavity 301 is configured to store the previous hot rinse water from the last washing process or the hot rinse water of the previous washing process. The second water storage cavity 302 is configured to store external fresh water. The second water supply pipeline 420 is configured to introduce the previous hot rinse water in the first water storage cavity 301 into the water collection cavity 210, and the previous hot rinse water is used as the current cold rinse water of the current washing process. The third water supply pipeline 430 is configured to introduce the external fresh water in the second water storage cavity 302 into the water collection cavity 210, and the external fresh water is used as the current cleaning water.

The tableware washing device 10 in the embodiment of the present disclosure includes an inner liner 100, a water collection cup 200 provided at the bottom of the inner liner 100 and a water tank 300. By storing the previous hot rinse water from the last washing process in the first water storage cavity 301 of the water tank 300, providing the first water supply pipeline 410 to send the washing water in the water collection cup 200 to the washing cavity of the inner liner 100, providing the second water supply pipeline 420 to introduce the previous hot rinse water in the first water storage cavity 301 into the water collection cup 200, using the previous hot rinse water as the current cold rinse water in the current washing process, providing the third water supply pipeline 430 to introduce the external fresh water in the second water storage cavity 302 of the water tank 300 into the water collection cup 200, using the external fresh water as the current cleaning water, the hot rinse water may be recycled, and a volume of water for a washing process may be saved. In this way, the water consumption of the tableware washing device 10 may be reduced, which is conducive to energy conservation and environmental protection.

In some embodiments, the current cleaning water is heated by the heating apparatus. The first water storage cavity 301 is further communicated to the water collection cavity 210 via a first drainage pipeline 440. The water collection cup 200 and/or the first drainage pipeline 440 is further provided with a drainage pump 520. The drainage pump 520 is configured to pump the current cleaning water to the first water storage cavity 301 via the first drainage pipeline 440 after a cleaning process is completed. Thus, during a cold rinse process, the current cleaning water may exchange heat with the external fresh water in the second water storage cavity 302. The third water supply pipeline 430 further introduces the external fresh water experiencing the heat exchange into the water collection cavity 210 when the cold rinse process is completed, and the external fresh water is used as the current hot rinse water. Therefore, a heating process of the hot rinse water may be omitted, and an amount of electricity for heating may be saved. In this way, the power consumption of the tableware washing device 10 may be reduced, which is conducive to energy conservation and environmental protection.

In some embodiments, the second water supply pipeline 420, the third water supply pipeline 430 and the first drainage pipeline 440 may also be communicated to the inner liner 100. The second water supply pipeline 420, the third water supply pipeline 430 and the first drainage pipeline 440 may then be all be communicated to the water collection cup 200 through the inner liner 100, which is not limited here.

In some embodiments, the tableware washing device 10 further includes a diverter valve 530 or a flow divider valve 530 provided on the second water supply pipeline 420. The tableware washing device 10 further includes a second drainage pipeline 450 communicated to the second water supply pipeline 420 via the diverter valve 530. The diverter valve 530 is configured to discharge the current cleaning water after the heat exchange process via the second drainage pipeline 450. The drainage pump 520 is further configured to pump the current hot rinse water to the first water storage cavity 301 via the first drainage pipeline 440 after the hot rinse process is completed, thereby realizing recovery of the current hot rinse water.

In some embodiments, the drainage pump 520 is further configured to pump the current cold rinse water to the first water storage cavity 301 via the first drainage pipeline 440 after the cold rinse process is completed, and discharge the current cold rinse water through the second drainage pipeline 450 and the diverter valve 530.

In some embodiments, the tableware washing device 10 further includes a pipeline combiner 540. The pipeline combiner 540 is configured to merge the second water supply pipeline 420 and the third water supply pipeline 430 into one pipeline and then the one pipeline is communicated to the water collection cavity 210. In this way, the arrangement of the pipelines may be much simpler, the structure of the tableware washing device 10 may be more compact, and a footprint of the tableware washing device 10 may be reduced.

In some embodiments, the tableware washing device 10 further includes a housing 600. The inner liner 100, the water collection cup 200 and the water tank 300 are all arranged in the housing 600. The housing 600 may protect structures such as the inner liner 100, the water collection cup 200, the water tank 300 and the like, and may enable an appearance of the tableware washing device 10 to be more neat and orderly.

In some embodiments, as shown in FIGS. 4-9, the water tank 300 includes a first sub water tank 310 and a second sub water tank 320. The first sub water tank 310 is arranged inside the second sub water tank 320. The first water storage cavity 301 is defined inside the first sub water tank 310. The second water storage cavity 302 is defined between the first sub water tank 310 and the second sub water tank 320. In this way, the washing water in the first water storage cavity 301 may exchange heat with the washing water in the second water storage cavity 302 through the first sub water tank 310. By arranging the first sub water tank 310 inside the second sub water tank 320, an outer surface of the first sub water tank 310 may entirely or fully be in contact with the washing water in the second water storage cavity 302, thereby the heat exchange area being larger and the heat exchange efficiency being higher.

In some embodiments, the water tank 300 is provided with a first water outlet 311, a second water outlet 321, a first adapter pipeline 330 and a second transfer line 340. The first adapter pipeline 330 is communicated to the first water outlet 311. The second adapter pipeline 340 is communicated to the second water outlet 321. The first water outlet 311 is communicated to the first water storage cavity 301. The second water outlet 321 is communicated to the second water storage cavity 302. The first water outlet 311 and the second water outlet 321 are provided on the top of the water tank 300. The first adapter pipeline 330 is configured to direct the washing water overflowing from the first water outlet 311 to the bottom of the water tank 300, which is then discharged via the third water outlet 312. The second adapter pipeline 340 is configured to direct the washing water overflowing from the second water outlet 321 to the bottom of the water tank 300, which is then discharged via the fourth water outlet 322. In some embodiments, by defining the first water outlet 311 and the second water outlet 321 on the top of the water tank 300, provision of valves may be omitted, the structure of the tableware washing device 10 may be made more simpler and more compact, the footprint or occupying space of the tableware washing device 10 may be reduced.

In some embodiments, the second water supply pipeline 420 is connected to the third water outlet 312, and is further connected to the first water outlet 311 via the first adapter pipeline 330. In this way, the previous hot rinse water in the first water storage cavity 301 is driven by the current cleaning water pumped by the drainage pump 520 and flows into the water collection cavity 210 via the second water supply pipeline 420.

In some embodiments, the third water supply pipeline 430 is connected to the fourth water outlet 322, and is further connected to the second water outlet 321 via the second adapter pipeline 340. In this way, the external fresh water in the second water storage cavity 302 is driven by the external fresh water sent by external water supply and flows into the water collection cavity 210 via the third water supply pipeline 430.

In some embodiments, a first water inlet 313 and a second water inlet 323 are defined on the bottom of the water tank 300. The first water inlet 313 is communicated to the first water storage cavity 301. The second water inlet 323 is communicated to the second water storage cavity 302.

Specifically, the tableware washing device 10 further includes a controller (not shown in the figures). In response to start of the tableware washing device 10, the controller controls the external fresh water to be introduced into the second water storage cavity 302 via the second water inlet 323. In this way, the external fresh water that is previously stored in the second water storage cavity 302 is expelled via the fourth water outlet 322, introduced into the water collection cavity 210 via the third water supply pipeline 430 and the pipeline combiner 540, and used as the current cleaning water. The current cleaning water may perform a pre-washing and a main washing through the washing pump 510 and the heating apparatus. During the main washing process, the current cleaning water is heated by the heating apparatus.

After the main washing process is completed, the controller controls the drainage pump 520 to pump the heated current cleaning water to the first water storage cavity 301 via the first drainage pipeline 440, such that the previous hot rinse water that is stored in the first water storage cavity 301 is expelled via the third water outlet 312. The previous hot rinse water is then introduced to the water collection cavity 210 via the second water supply pipeline 420, the diverter valve 530 and the pipeline combiner 540, and used as the current cold rinse water. The current cold rinse water may perform the cold rinse by the washing pump 510. During the cold rinse process, the current cleaning water in the first water storage cavity 301 and the external fresh water in the second water storage cavity 302 may exchange heat.

After the cold rinse process is completed, the controller controls the drainage pump 520 to pump the current cold rinse water to the first water storage cavity 301 via the first drainage pipeline 440, such that the current cleaning water that is stored in the first water storage cavity 301 is expelled via the third water outlet 312, and discharged via the second water supply pipeline 420, the diverter valve 530 and the second drainage pipeline 450. The controller controls the external fresh water to be introduced into the second water storage cavity 302 via the second water inlet 323. In this way, the external fresh water that has exchanged heat with the current cleaning water is expelled via the fourth water outlet 322, introduced into the water collection cavity 210 via the third water supply pipeline 430 and the pipeline combiner 540, and used as the current hot rinse water. The current hot rinse water performs the hot rinse by the washing pump 510.

After the hot rinse process is completed, the controller controls the drainage pump 520 to pump the current hot rinse water to the first water storage cavity 301 via the first drainage pipeline 440, such that the current cold rinse water that is stored in the first water storage cavity 301 is expelled via the third water outlet 312, and discharged via the second water supply pipeline 420, the diverter valve 530 and the second drainage pipeline 450, and the washing process is over. The current hot rinse water in the first water storage cavity 301 and the external fresh water in the second water storage cavity 302 would exchange heat with atmosphere air until their temperatures become the room temperature.

Figure 10:
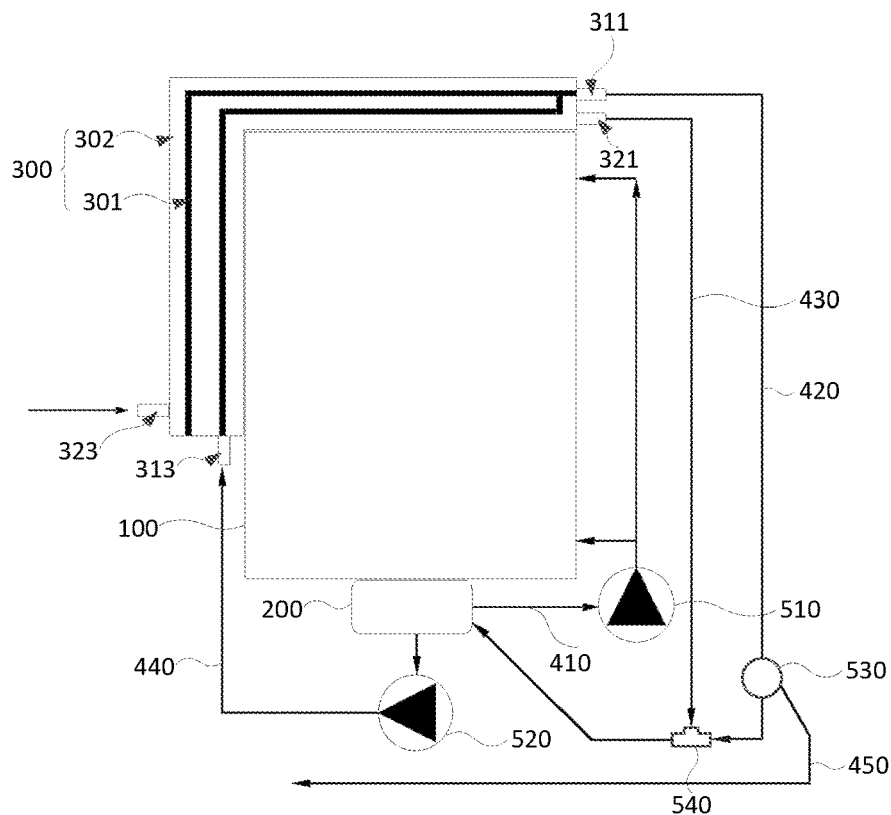
FIG. 10 is a schematic structural diagram of a tableware washing device according to an embodiment of the present disclosure.
Figure 11:
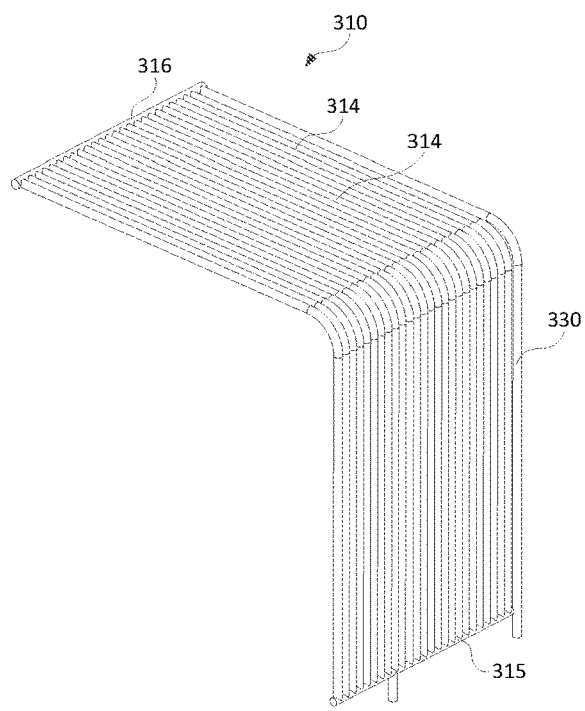
FIG. 11 is a schematic three-dimensional structural diagram of a first sub water tank of a tableware washing device according to an embodiment of the present disclosure.
Figure 12:
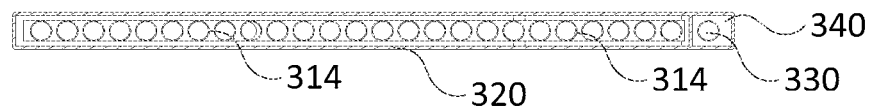
FIG. 12 is a schematic sectional structural diagram along a direction A-A of an embodiment of the tableware washing device in FIG. 5.
Figure 13:
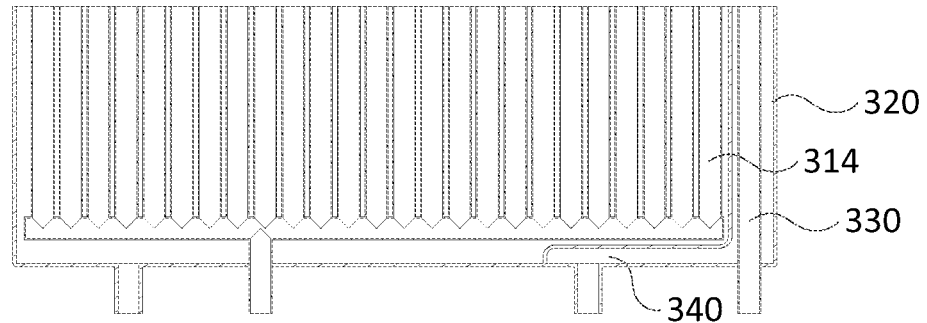
FIG. 13 is a schematic partial sectional structural diagram along a direction B-B of an embodiment of the tableware washing device in FIG. 5.
Figure 14:
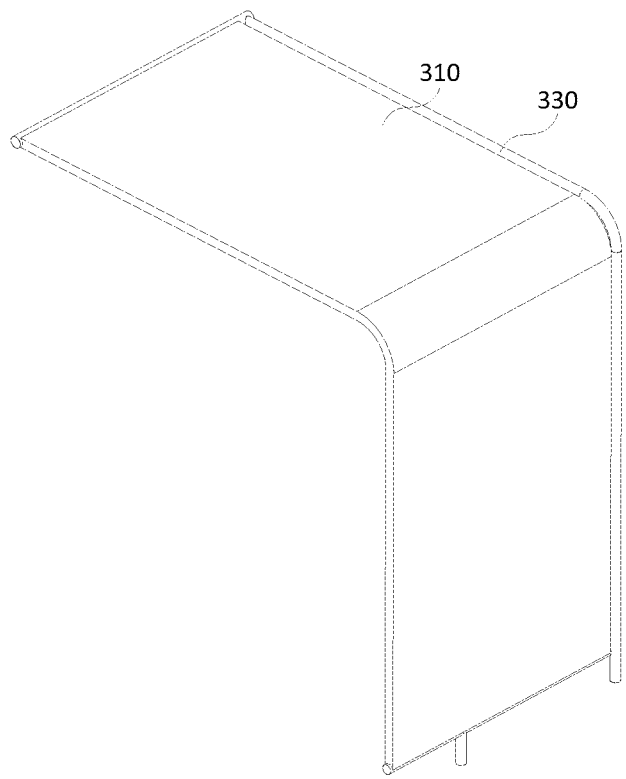
FIG. 14 is a schematic three-dimensional structural diagram of a first sub water tank of a tableware washing device according to an embodiment of the present disclosure.
Figure 15:
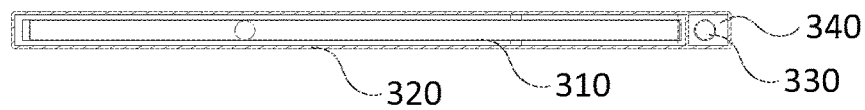
FIG. 15 is a schematic sectional structural diagram along a direction A-A of an embodiment of the tableware washing device in FIG. 5.
Figure 16:
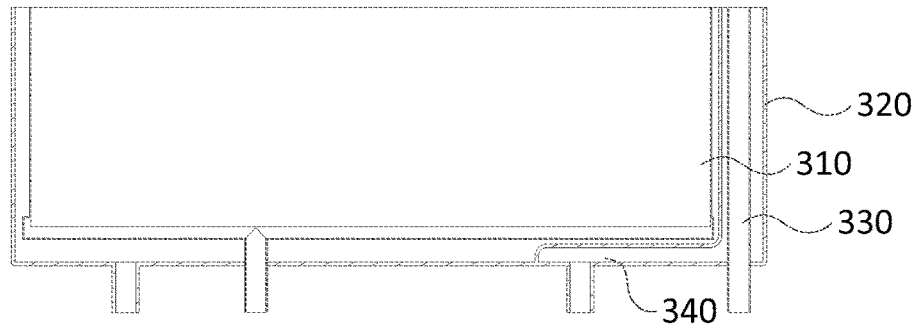
FIG. 16 is a schematic partial sectional structural diagram along a direction B-B of an embodiment of the tableware washing device in FIG. 5.

As shown in FIG. 10, in some embodiments, the second water supply pipeline 420 may be directly connected to the first water outlet 311, the third water supply pipeline 430 may be directly connected to the second water outlet 321. In this way, the arrangement of the adapter pipeline is thus omitted, the structure of the tableware washing device 10 may be more simple and compact, a footprint of the tableware washing device 10 may be reduced.

In some embodiments, further as shown in FIGS. 4-9, the water tank 300 has an L shape. The water tank 300 at least partially covers a side wall and a top wall of the inner liner 100. Each of the first water storage cavity 301 and the second water storage cavity 302 has an L shape corresponding to that of the water tank 300, such that the washing water in the first water storage cavity 301 and the washing water in the second water storage cavity 302 may exchange heat. In this way, heat of the washing water may be recovered, the amount of electricity used to heat the washing water may be saved, the power consumption of the tableware washing device may be reduced, thereby facilitating power conservation and environmental protection. By setting the water tank 300 to have an L shape, installation of the water tank 300 with the inner liner 100 may be facilitated, heat exchange area of the water tank is larger, and heat exchange efficiency is enhanced.

In some embodiments, a volume ratio of the first water storage cavity 301 and the second water storage cavity 302 is in the range of 0.9 to 1.1, such as 0.9, 1 or 1.1. In this way, water volumes of the cleaning water, the cold rinse water and the hot rinse water remain substantially the same, the recycling of the washing water is facilitated.

In some embodiments, a surface of the first sub water tank 310 has an undulating shape, such as a wave-like shape or a sawtooth-like shape. In this way, a contact area between the first sub water tank 310 and the washing water in the second water storage cavity 302 may be increased, thereby increasing the heat-exchange area between the washing water in the first water storage cavity 301 and the washing water in the second water storage cavity 302, and increasing the heat-exchange efficiency.

As shown in FIG. 5 and FIGS. 11-13, in some embodiments, the first sub water tank 310 may include a plurality of heat exchange tubes 314 arranged side-by-side, a manifold 315 connected to one end of each of the plurality of heat exchange tubes 314, and a header 316 or a collector 316 connected to the other end of each of the plurality of heat exchange tubes 314. The washing water flows into the plurality of heat exchange tubes 314 via the manifold 315, and flows out via the header 316. By providing the plurality of heat exchange tubes, the contact area between the first sub water tank 310 and the washing water in the second water storage cavity 302 may be further increased, thereby increasing the heat exchange area of the washing water in the first water storage cavity 301 and the washing water in the second water storage chamber 302, and enhancing the heat exchange efficiency.

As shown in FIG. 5 and FIGS. 14-16, the surface of the first sub water tank 310 may also be a planar surface, such that the washing water in the first water storage cavity 301 and the washing water in the second water storage cavity 302 may exchange heat with each other, which is not limited here.

Figure 17:
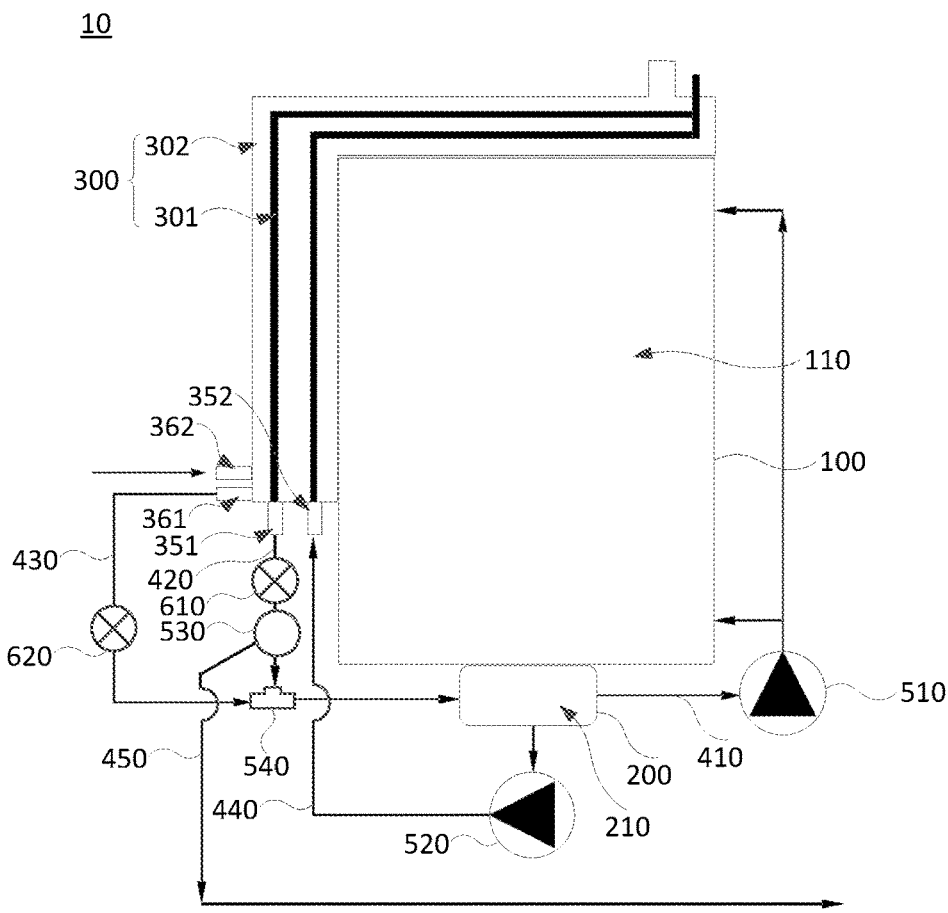
FIG. 17 is a schematic structural diagram of a tableware washing device according to an embodiment of the present disclosure.
Figure 18:
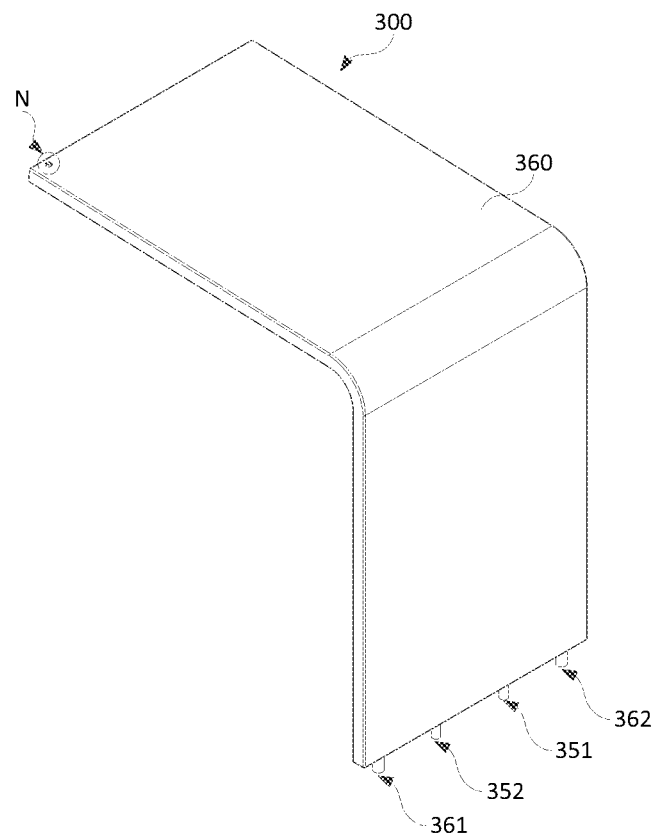
FIG. 18 is a schematic three-dimensional structural diagram of a water tank of a tableware washing device according to an embodiment of the present disclosure.
Figure 19:
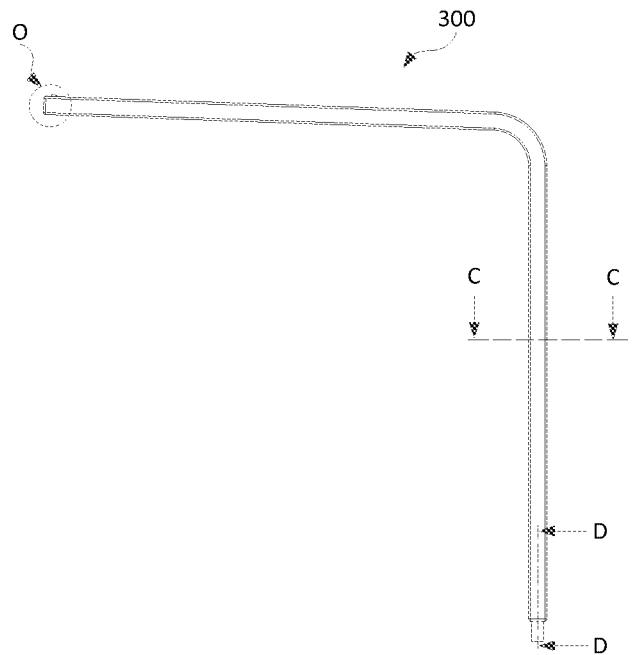
FIG. 19 is a schematic structural side view of a water tank of a tableware washing device according to an embodiment of the present disclosure.
Figure 20:
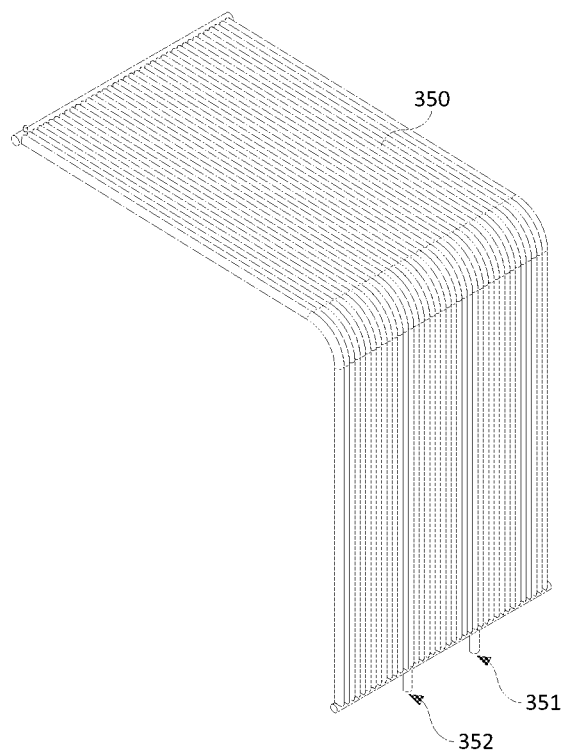
FIG. 20 is a schematic three-dimensional structural diagram of a first sub water tank of a tableware washing device according to an embodiment of the present disclosure.
Figure 21:
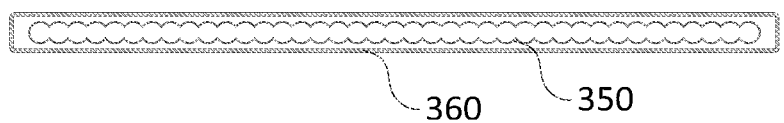
FIG. 21 is a schematic sectional structural diagram along a direction C-C of an embodiment of the tableware washing device in FIG. 19.
Figure 22:
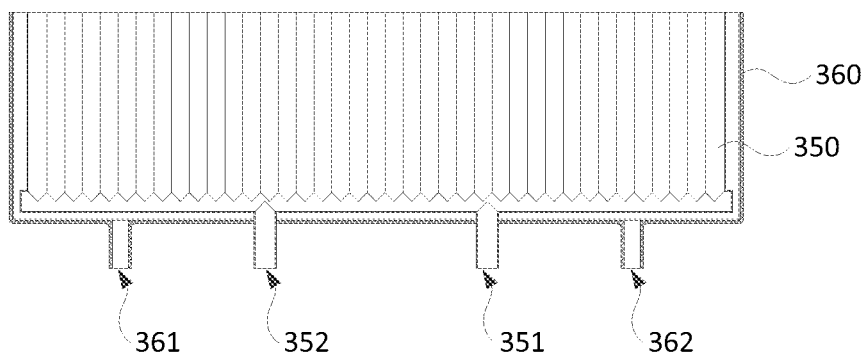
FIG. 22 is a schematic partial sectional structural diagram along a direction D-D of an embodiment of the tableware washing device in FIG. 19.

As shown in FIG. 17, according to some embodiments of the present disclosure, the tableware washing device 10 includes the inner liner 100, the water collection cup 200 and the water tank 300. The inner liner 100, the water collection cup 200 and the water tank 300 are interconnected by a water supply pipeline and a drainage pipeline. The import and export of the washing water is realized by the washing pump 510, the drainage pump 520, the diverter valve 530 and the pipeline combiner 540. The arrangement and structure of the tableware washing device 10 may refer to the embodiment of the tableware washing device 10 as shown in FIG. 3, and will not be repeated here.

The difference between this embodiment and the above-mentioned embodiments resides in that, the tableware washing device 10 further includes a first valve 610 and a second valve 620. The first valve 610 is provided on the second water supply pipeline 420, and configured to control opening and closing of the second water supply pipeline 420. The second valve 620 is provided on the third water supply pipeline 430, and configured to control opening and closing of the third water supply pipeline 430.

As shown in FIGS. 18-22, in some embodiments, the water tank 300 includes a first sub water tank 350 and a second sub water tank 360. The first sub water tank 350 is arranged inside the second sub water tank 360, such that the first water storage cavity 301 is defined inside the first sub water tank 350, and the second water storage cavity 302 is defined between the first sub water tank 350 and the second sub water tank 360. In this way, the washing water in the first water storage cavity 301 may exchange heat with the washing water in the second water storage cavity 302 through the first sub water tank 350. By arranging the first sub water tank 350 inside the second sub water tank 360, the outer surface of the first sub water tank 350 may be entirely in contact with the washing water in the second water storage cavity 302, thereby the heat exchange area being larger and the heat exchange efficiency being higher.

In some embodiments, each of a first water outlet 351, a first water inlet 352, a second water outlet 361 and a second water inlet 362 is provided at the bottom of the water tank 300. Each of the first water outlet 351 and the first water inlet 352 is communicated to the first water storage cavity 301. Each of the second water outlet 361 and the second water inlet 362 is communicated to the second water storage cavity 302. The second water supply pipeline 420 is connected to the first water outlet 351, such that under the action of its own gravity, the previous hot rinse water in the first water storage cavity 301 may flow into the water collection cavity 210 via the second water supply pipeline 420. The third water supply pipeline 430 is connected to the second water outlet 361, such that under the action of its own gravity, the external fresh water in the second water storage cavity 302 may flow into the water collection cavity 210 via the third water supply pipeline 430.

Specifically, the tableware washing device 10 further includes a controller (not shown in the figures). In response to start of the tableware washing device 10, the controller controls the first valve 610 to open and the second valve 620 to close. In this way, the previous hot rinse water that is stored in the first water storage cavity 301 previously is introduced, under the action of its own gravity, into the water collection cavity 210 via the first water outlet 351, the second water supply pipeline 420, the diverter valve 530 and the pipeline combiner 540, and used as the current cleaning water. The controller controls the first valve 610 to close. The current cleaning water performs the pre-washing and the main washing through the washing pump 510 and the heating apparatus. During the main washing process, the current cleaning water is heated by the heating apparatus.

After the main washing process is completed, the controller controls the drainage pump 520 to pump the heated current cleaning water to the first water storage cavity 301 via the first drainage pipeline 440. The controller controls the second valve 620 to open, such that the external fresh water in the second water storage cavity 302 is introduced under the action of its own gravity, into the water collection cavity 210 via the second water outlet 361, the third water supply pipeline 430 and the pipeline combiner 540, and used as the current cold rinse water. The controller controls the second valve 620 to close, and controls the external fresh water to be introduced into the second water storage cavity 302 via the second water inlet 362. The external fresh water performs the cold rinse by the washing pump 510. During the cold rinse process, the current cleaning water in the first water storage cavity 301 and the external fresh water in the second water storage cavity 302 may exchange heat.

After the cold rinse process is completed, the controller controls the first valve 610 to open, such that the current cleaning water stored in the first water storage cavity 301 is discharged under the action of its own gravity via the first water outlet 351, the second water supply pipeline 420, the diverter valve 530 and the second drainage pipeline 450. The controller controls the first valve 610 to close. The controller further controls the drainage pump 520 to pump the current cold rinse water to the first water storage cavity 301 via the first drainage pipeline 440. Then the controller controls the second valve 620 to open. In this way, the external fresh water that has exchanged heat with the current cleaning water is introduced into the water collection cavity 210 via the second water outlet 361, the third water supply pipeline 430 and the pipeline combiner 540, and used as the current hot rinse water. The controller controls the second valve 620 to close, and controls the external fresh water to be introduced into the second water storage cavity 302 via the second water inlet 362. The external fresh water performs the hot rinse by the washing pump 510.

After the hot rinse process is completed, the controller controls the first valve 610 to open, such that the current cold rinse water stored in the first water storage cavity 301 is discharged under the action of its own gravity via the first water outlet 351, the second water supply pipeline 420, the diverter valve 530 and the second drainage pipeline 450. The controller controls the first valve 610 to close. The controller further controls the drainage pump 520 to pump the current hot rinse water to the first water storage cavity 301 via the first drainage pipeline 440. The washing process is over. The current hot rinse water in the first water storage cavity 301 and the external fresh water in the second water storage cavity 302 would exchange heat with atmosphere air until their temperatures become the room temperature.

As further shown in FIGS. 18-22, in some embodiments, the water tank 300 has an L shape. The water tank 300 at least partially covers a side wall and a top wall of the inner liner 100. Each of the first water storage cavity 301 and the second water storage cavity 302 has an L shape corresponding to that of the water tank 300, such that the washing water in the first water storage cavity 301 and the washing water in the second water storage cavity 302 may exchange heat. In this way, heat of the washing water may be recovered, the amount of electricity used to heat the washing water may be saved, the power consumption of the tableware washing device may be reduced, thereby facilitating power conservation and environmental protection. By setting the water tank 300 to have an L shape, installation of the water tank 300 with the inner liner 100 may be facilitated, heat exchange area of the water tank may be larger, and heat exchange efficiency may be enhanced.

In some embodiments, an angle θ between a portion of the water tank 300 covering the side wall of the inner liner 100 and a portion of the water tank 300 covering the top wall is in a range of 92° to 95°, such as 92°, 93° or 95°, thus the washing water inside a portion of the first water storage cavity 301 corresponding to the top wall of the inner liner 100 is enabled to flow to the bottom of the water tank 300 under the action of its own gravity, and the washing water inside a portion of the second water storage cavity 302 corresponding to the top wall of the inner liner 100 is enabled to flow to the bottom of the water tank 300 under the action of its own gravity.

In some embodiments, a volume ratio of the first water storage cavity 301 and the second water storage cavity 302 is in the range of 0.9 to 1.1, such as 0.9, 1 or 1.1. In this way, water volumes of the cleaning water, the cold rinse water and the hot rinse water remain substantially the same, the recycling of the washing water is facilitated.

In some embodiments, the surface of the first sub water tank 350 has an undulating shape, such as a wave-like shape or a sawtooth-like shape. In this way, a contact area between the first sub water tank 350 and the washing water in the second water storage cavity 302 may be increased, thereby increasing the heat-exchange area between the washing water in the first water storage cavity 301 and the washing water in the second water storage cavity 302, and enhancing the heat-exchange efficiency.

Figure 23:
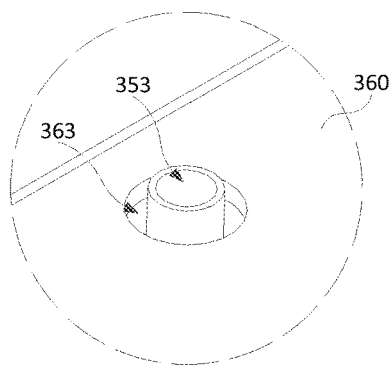
FIG. 23 is a schematic partial structural diagram of the circle N of an embodiment of the tableware washing device in FIG. 18.
Figure 24:
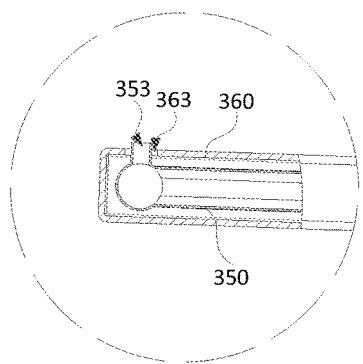
FIG. 24 is a schematic sectional structural diagram of the circle O of an embodiment of the tableware washing device in FIG. 19.
Figure 25:
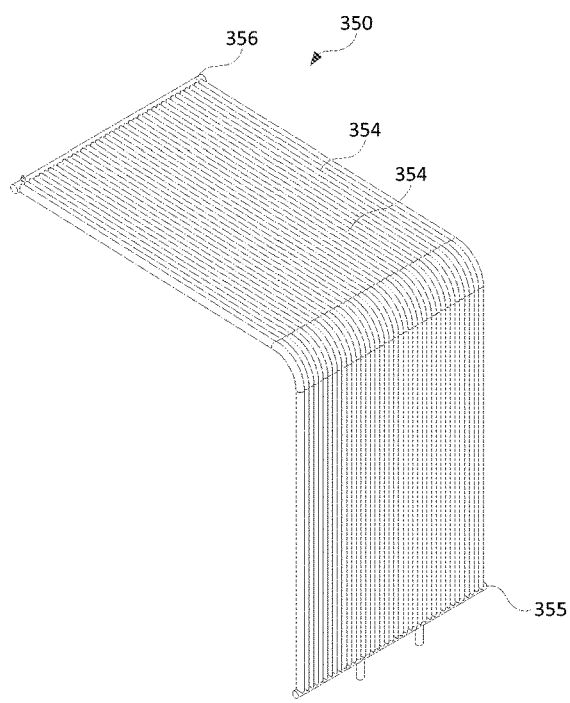
FIG. 25 is a schematic three-dimensional structural diagram of a first sub water tank of a tableware washing device according to an embodiment of the present disclosure.
Figure 26:
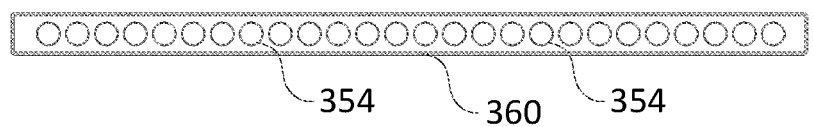
FIG. 26 is a schematic sectional structural diagram along a direction C-C of an embodiment of the tableware washing device in FIG. 19.
Figure 27:
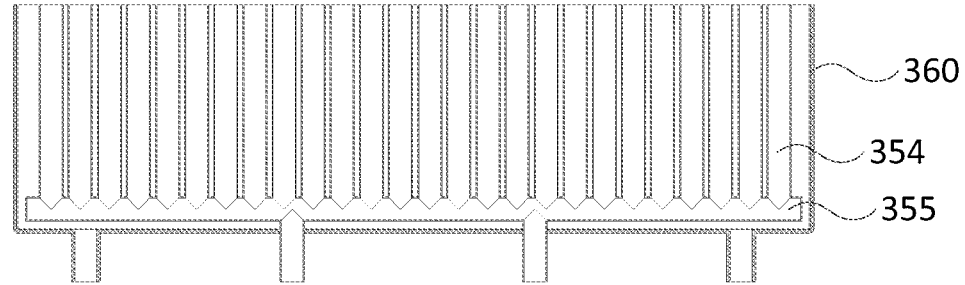
FIG. 27 is a schematic partial sectional structural diagram along a direction D-D of an embodiment of the tableware washing device in FIG. 19.

As shown in FIGS. 23 and 24, in some embodiments, a first air vent 353 is defined at the top of the first sub water tank 350, and the first air vent 353 is communicated to the first water storage cavity 301. A second air vent 363 is defined at the top of the second sub water tank 360, and the second air vent 363 is communicated to the second water storage cavity 302. The first air vent 353 may prevent generation of negative pressure when the washing water in the first water storage cavity 301 flows to the bottom of the first water storage cavity 301. The second air vent 363 may prevent generation of the negative pressure when the washing water in the second water storage cavity 302 flows to the bottom of the second water storage cavity 302. The washing water can't be discharged smoothly due to the negative pressure.

In some embodiments, one of the first air vent 353 and the second air vent 363 is nested in the other of the first air vent 353 and the second air vent 363, thus the number of vents in the second sub water tank 360 may be reduced, the structure of the second sub water tank 360 may be more simple, neat and orderly.

In some embodiments, the first air vent 353 and the second air vent 363 may also be spaced apart, which is not limited here.

As shown in FIG. 19 and FIGS. 25-27, in some embodiments, the first sub water tank 350 may include a plurality of heat exchange tubes 354 arranged side-by-side, a manifold 355 connected to one end of each of the plurality of heat exchange tubes 354, and a header 356 or a collector 356 connected to the other end of each of the plurality of heat exchange tubes 354. The washing water flows into the plurality of heat exchange tubes 354 via the manifold 355, and flows out via the header 356. By arranging the plurality of heat exchange tubes, the contact area between the first sub water tank 350 and the washing water in the second water storage chamber 302 may be further increased, thereby increasing the heat exchange area of the washing water in the first water storage cavity 301 and the washing water in the second water storage chamber 302, and enhancing the heat-exchange efficiency.

Figure 28:
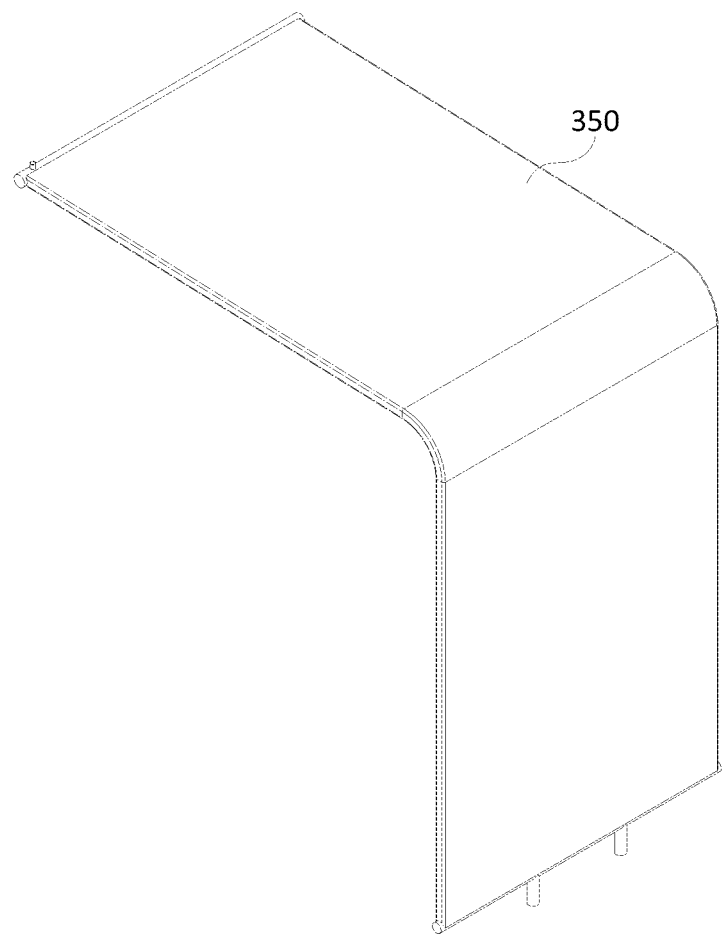
FIG. 28 is a schematic three-dimensional structural diagram of a first sub water tank of a tableware washing device according to an embodiment of the present disclosure.
Figure 29:
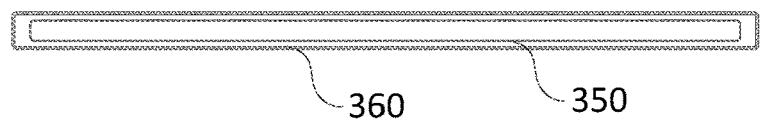
FIG. 29 is a schematic sectional structural diagram along a direction C-C of an embodiment of the tableware washing device in FIG. 19.
Figure 30:
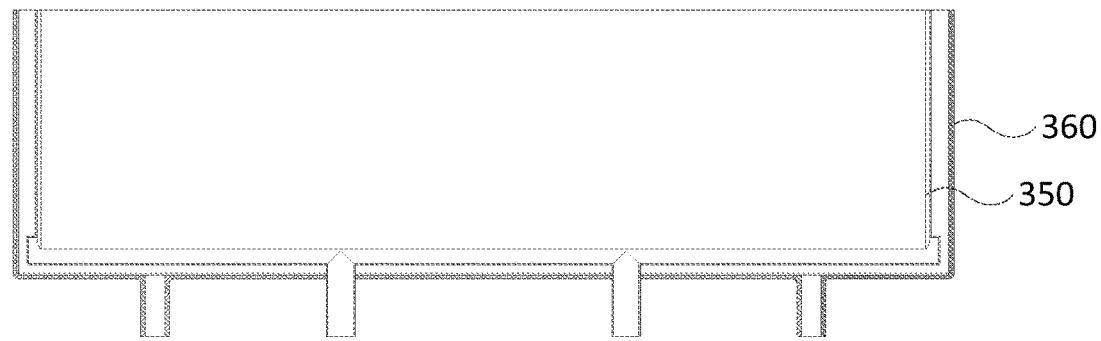
FIG. 30 is a schematic partial sectional structural diagram along a direction D-D of an embodiment of the tableware washing device in FIG. 19.
Figure 31:
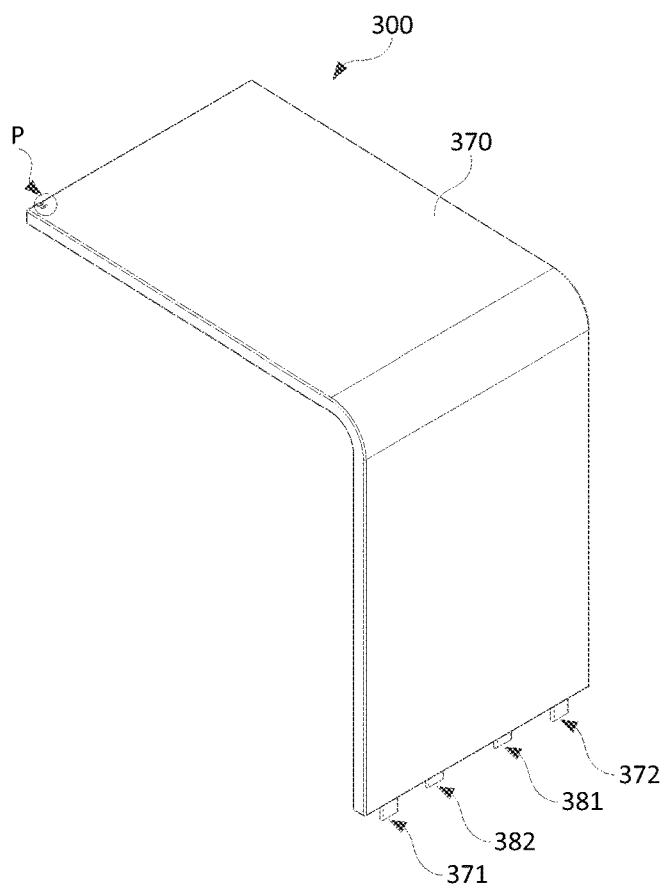
FIG. 31 is a schematic three-dimensional structural diagram of a water tank of a tableware washing device according to an embodiment of the present disclosure.
Figure 32:
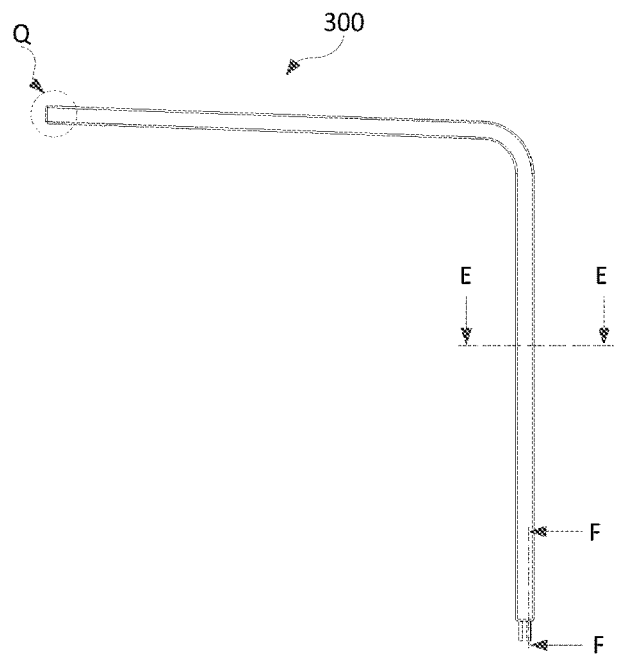
FIG. 32 is a schematic structural side view of a water tank of a tableware washing device according to an embodiment of the present disclosure.
Figure 33:
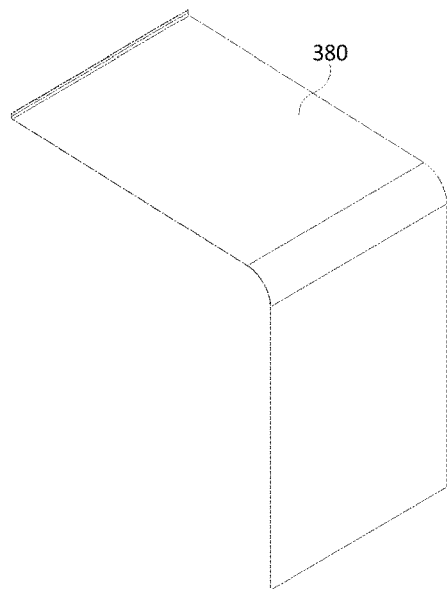
FIG. 33 is a schematic three-dimensional structural diagram of a spacer of a tableware washing device according to an embodiment of the present disclosure.
Figure 34:
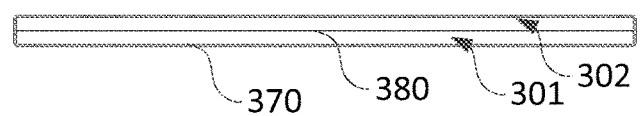
FIG. 34 is a schematic sectional structural diagram along a direction E-E of an embodiment of the tableware washing device in FIG. 32.
Figure 35:
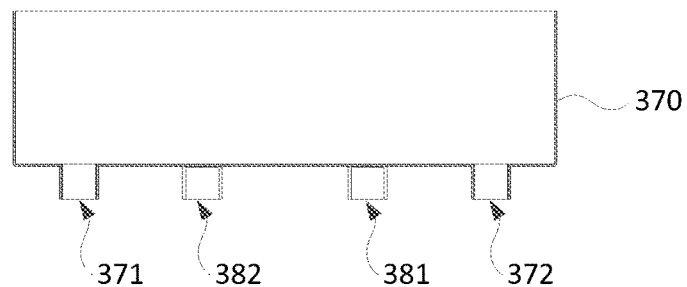
FIG. 35 is a schematic partial sectional structural diagram along a direction F-F of an embodiment of the tableware washing device in FIG. 32.

As shown in FIGS. 28-30, the surface of the first sub water tank 350 may also be a planar surface, such that the washing water in the first water storage cavity 301 and the washing water in the second water storage cavity 302 may exchange heat with each other, which is not limited here.

As shown in FIGS. 31-35, in the tableware washing device 10 according to some embodiments of the present disclosure, the water tank 300 includes a main tank body 370 and a partition plate 380 or a spacer 380. The main tank body 370 defines a general cavity. The partition plate 380 is arranged in the general cavity, and divides the general cavity into the first water storage cavity 301 at one side of the partition plate 380 and the second water storage cavity 302 at the other side of the partition plate 380. In this way, the washing water in the first water storage cavity 301 exchanges heat with the washing water in the second water storage cavity 302 through the partition plate 380. The partition plate 380 has a planar surface. By defining the first water storage cavity 301 and the second water storage cavity 302 with the main tank body 370 and the partition plate 380, the structure of the water tank 300 is made much simpler, and is easier to manufacture.

In some embodiments, each of a first water outlet 381, a first water inlet 382, a second water outlet 371 and a second water inlet 372 is arranged at the bottom of the water tank 300. Each of the first water outlet 381 and the first water inlet 382 is communicated to the first water storage cavity 301. Each of the second water outlet 371 and the second water inlet 372 is communicated to the second water storage cavity 302.

Figure 36:
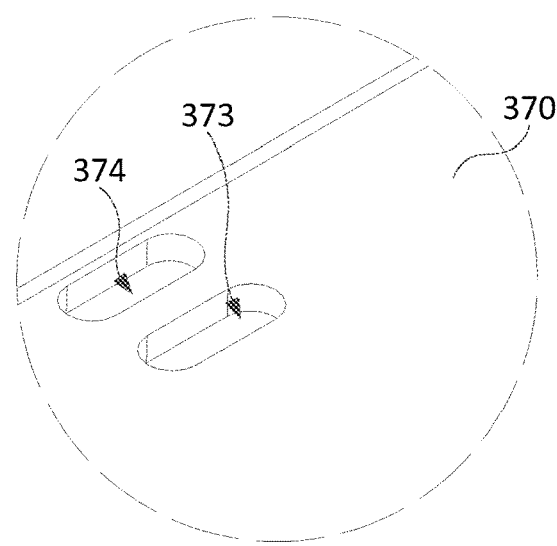
FIG. 36 is a schematic partial structural diagram of the circle P of an embodiment of the tableware washing device in FIG. 31.
Figure 37:
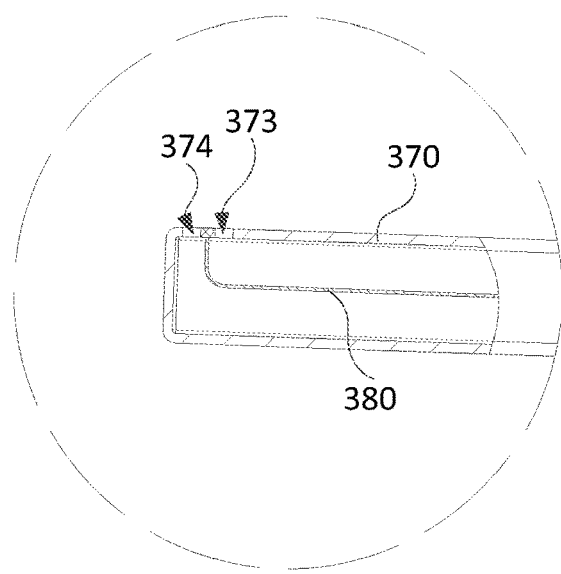
FIG. 37 is a schematic sectional structural diagram of the circle Q of an embodiment of the tableware washing device in FIG. 32.

As shown in FIGS. 36-37, in some embodiments, each of a first air vent 373 and a second air vent 374 is defined on the top of the main tank body 370. The first air vent 373 and the second air vent 374 are defined staggered with respect to each other. The first air vent 373 is communicated to the first water storage cavity 301. The second air vent 374 is communicated to the second water storage cavity 302. The first air vent 353 may prevent generation of negative pressure when the washing water in the first water storage cavity 301 flows to the bottom of the first water storage cavity 301. The second air vent 363 may prevent generation of the negative pressure when the washing water in the second water storage cavity 302 flows to the bottom of the second water storage cavity 302. The washing water can't be discharged smoothly due to the negative pressure.

Figure 38:
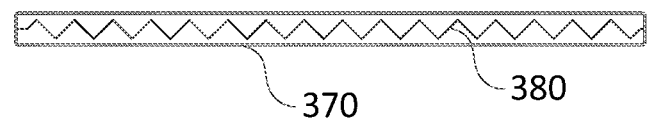
FIG. 38 is a schematic sectional structural diagram along a direction E-E of an embodiment of the tableware washing device in FIG. 32.
Figure 39:
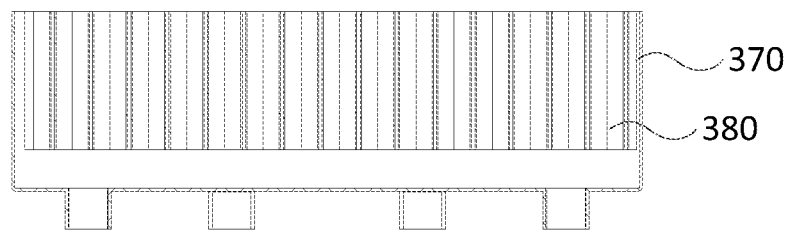
FIG. 39 is a schematic partial sectional structural diagram along a direction F-F of an embodiment of the tableware washing device in FIG. 32.
Figure 40:
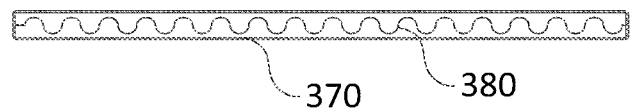
FIG. 40 is a schematic sectional structural diagram along a direction E-E of an embodiment of the tableware washing device in FIG. 32.
Figure 41:
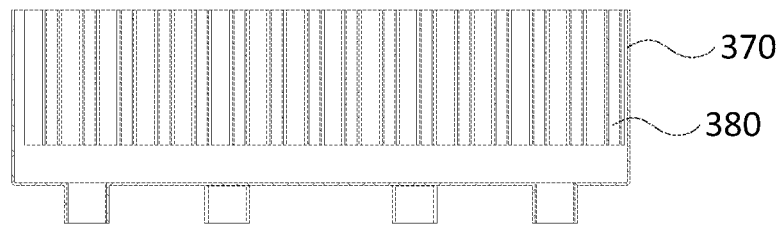
FIG. 41 is a schematic partial sectional structural diagram along a direction F-F of an embodiment of the tableware washing device in FIG. 32.

In some embodiments, the partition plate 380 may also have an undulating shape. For example, as shown in FIG. 38 and FIG. 39, the partition plate 380 may have a sawtooth-like shape. In some embodiments, as shown in FIG. 40 and FIG. 41, the partition plate 380 may have a wave-like shape. In this way, a surface area of the partition plate 380 may be increased, thereby increasing the heat-exchange area of the washing water in the first water storage cavity 301 and the washing water in the second water storage cavity 302, and enhancing the heat-exchange efficiency.

Figure 42:
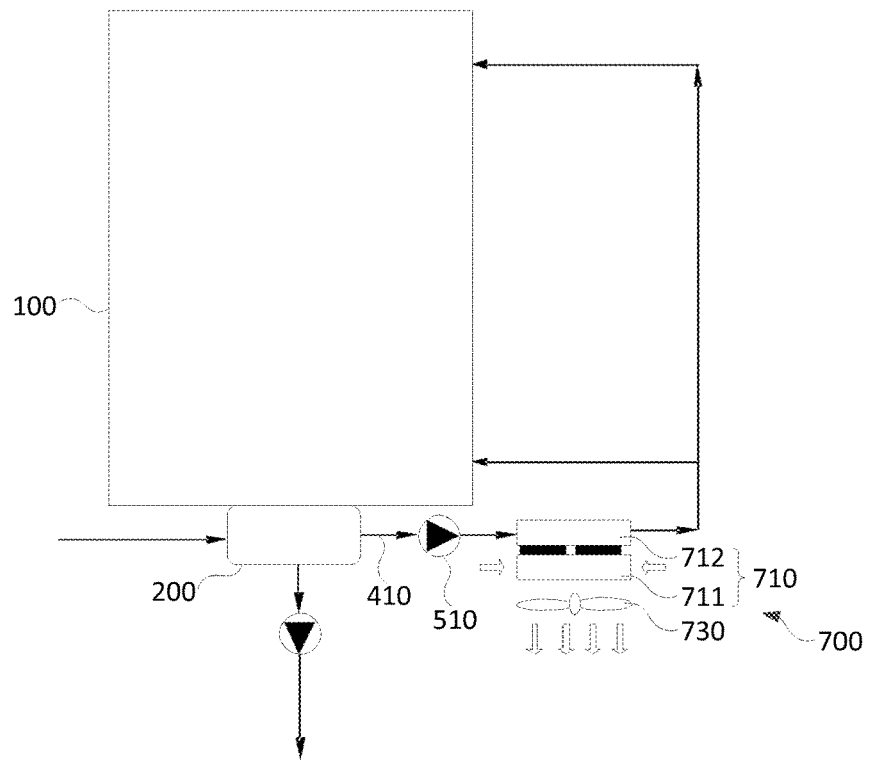
FIG. 42 is a schematic structural diagram of a tableware washing device according to an embodiment of the present disclosure.

As shown in FIG. 42, according to some embodiments of the present disclosure, the tableware washing device 10 includes the inner liner 100, the water collection cup 200 and a water tank (not shown in the figure). The structure of each of the inner liner 100, the water collection cup 200 and the water tank refers to the above-mentioned embodiments of the tableware washing device 10, which will not be repeated here.

In some embodiments, the washing pump 510 is provided on the water collection cup 200 and/or the first water supply pipeline 410. The heating apparatus 700 is provided on the water collection cup 200 and/or the first water supply pipeline 410. The washing pump 510 is configured to pump the washing water in the water collection cup 200 to the inner liner 100 via the first water supply pipeline 410. The heating apparatus 700 is configured to selectively heat the washing water.

In some embodiments, the heating apparatus 700 includes a semiconductor cooler 710. The semiconductor cooler 710 is configured to heat the washing water at one time. Compared with heating the washing water through an electric heater, heating the washing water through the semiconductor cooler 710 may save a large amount of electricity. In this way, the power consumption of the tableware washing device 10 may be reduced, which is conducive to energy conservation and environmental protection.

Figure 43:
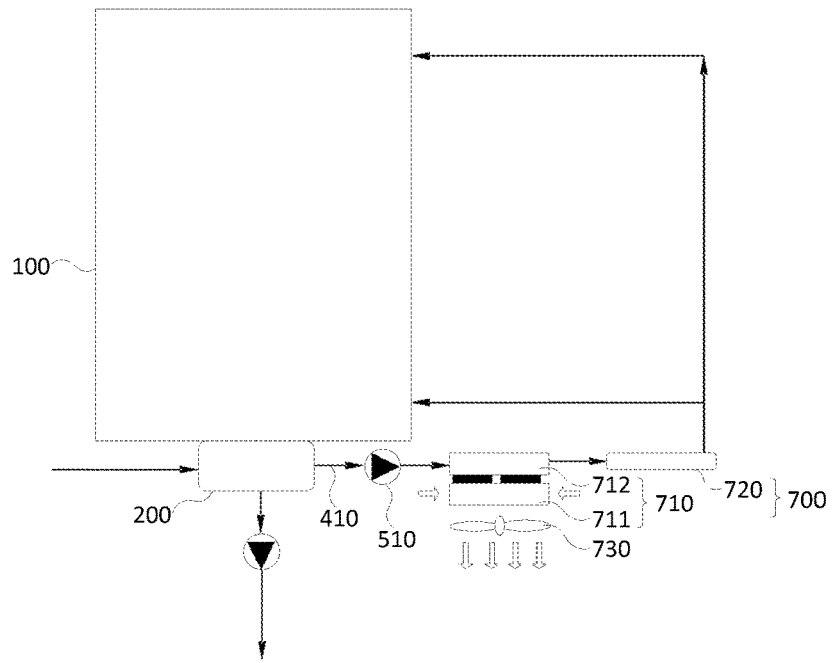
FIG. 43 is a schematic structural diagram of a tableware washing device according to an embodiment of the present disclosure.

As shown in FIG. 43, according to some embodiments of the present disclosure, the tableware washing device 10 includes the inner liner 100, the water collection cup 200 and a water tank (not shown in the figure). The structure of each of the inner liner 100, the water collection cup 200 and the water tank refers to the above-mentioned embodiments of the tableware washing device 10, which will not be repeated here.

In some embodiments, the washing pump 510 is provided on the water collection cup 200 and/or the first water supply pipeline 410. The heating apparatus 700 is provided on the water collection cup 200 and/or the first water supply pipeline 410. The washing pump 510 is configured to pump the washing water in the water collection cup 200 to the inner liner 100 via the first water supply pipeline 410. The heating apparatus 700 is configured to selectively heat the washing water.

In some embodiments, the heating apparatus 700 includes a semiconductor cooler 710 and an electric heater 720. The semiconductor cooler 710 is located upstream of the electric heater 720, and is configured for a primary heating of the washing water. The electric heater 720 is configured for a secondary heating of the washing water that has been heated by the semiconductor cooler 710. Compared with merely heating the washing water through the electric heater, heating by the semiconductor cooler 710 partially may save a large amount of electricity. In this way, the power consumption of the tableware washing device 10 may be reduced, which is conducive to energy conservation and environmental protection.

In some embodiments, a heating power of the semiconductor cooler 710 is in a range of 40% to 60% of a total heating power of the semiconductor cooler 710 and the electric heater 720, such as 40%, 50%, or 60%. Therefore, while ensuring an enough heat transfer efficiency, the semiconductor cooler 710 may realize a function of saving power.

In some embodiments, the semiconductor cooler 710 includes a refrigeration end 711 and a heating end 712. The heating end 712 is configured to heat the washing water. The tableware washing device 10 may further include a fan 730. The fan 730 is arranged oppositely to the refrigeration end 711. The fan 730 is configured to speed up the heat-exchange speed between the refrigeration end 711 and the atmosphere air or liquid. Thus, the heat-exchange efficiency of the semiconductor cooler 710 may be enhanced.

Figure 44:
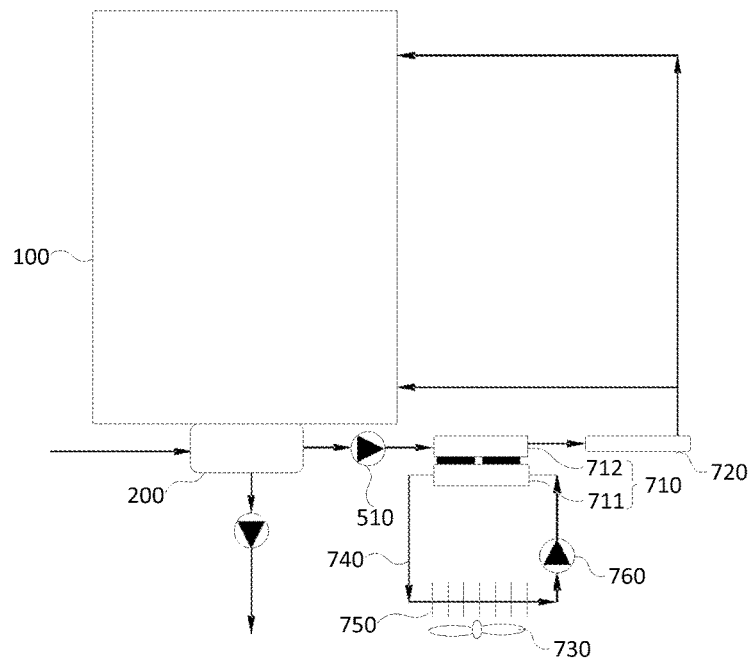
FIG. 44 is a schematic structural diagram of a tableware washing device according to an embodiment of the present disclosure.

As shown in FIG. 44, in the tableware washing device 10 according to some embodiments of the present disclosure, the semiconductor cooler 710 includes a refrigeration end 711 and a heating end 712. The heating end 712 is configured to heat the washing water. The tableware washing device 10 further includes a heat-exchange pipeline 740 connected to the refrigeration end 711, an auxiliary heat exchanger 750 and a heat-exchange pump 760. Each of the auxiliary heat exchanger 750 and the heat-exchange pump 760 is arranged on the heat-exchange pipeline 740. The heat-exchange pipeline 740 forms a circulation loop. The auxiliary heat exchanger 750 is configured to perform heat exchange with atmosphere air or liquid, and heat the heat-exchange liquid in the heat-exchange pipeline 740. The heat-exchange liquid is pumped by the heat-exchange pump 760 to circulate in the circulation loop, and performs heat exchange with the refrigeration end 711.

In some embodiments, the auxiliary heat exchanger 750 may be a water-cooled heat exchanger or an air-cooled heat exchanger, which is not limited here.

In some embodiments, the tableware washing device 10 may further include a fan 730. The fan 730 is arranged oppositely to the auxiliary heat exchanger 750. The fan 730 is configured to speed up heat-exchange speed between the auxiliary heat exchanger 750 and the atmosphere air or liquid. In this way, the heat-exchange efficiency of the auxiliary heat exchanger 750 may be increased.

Figure 45:
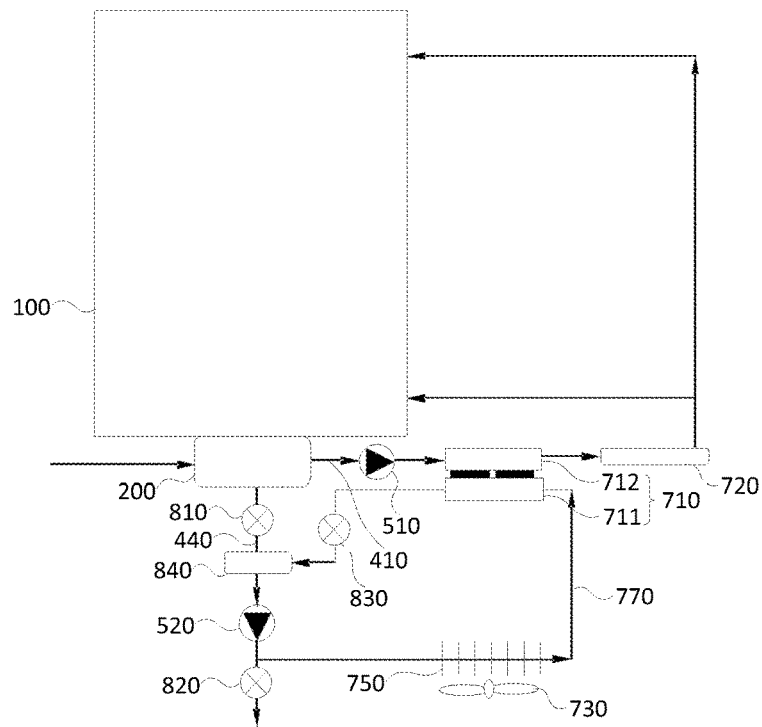
FIG. 45 is a schematic structural diagram of a tableware washing device according to an embodiment of the present disclosure.

As shown in FIG. 45, in the tableware washing device 10 according to some embodiments of the present disclosure, the semiconductor cooler 710 includes a refrigeration end 711 and a heating end 712. The heating end 712 is configured to heat the washing water. The tableware washing device 10 further includes a heat-exchange pipeline 770 and an auxiliary heat exchanger 750. The heat-exchange pipeline 770 is connected to the refrigeration end 711. The auxiliary heat exchanger 750 is arranged on the heat-exchange pipeline 770. The heat-exchange pipeline 770 and the first drainage pipeline 440 communicated to the water collection cup 200 may cooperate to form a circulation loop. The washing water is then used as the heat-exchange liquid. The heat-exchange liquid is pumped by the drainage pump 520 in the first drainage pipeline 440 to circulate in the circulation loop, and performs heat exchange with the refrigeration end 711. The washing water is used as the heat-exchange liquid and exchanges heat with the refrigeration end 711, and a stand-alone circulating heat-exchange apparatus for the refrigeration end 711 may be omitted. In this way, the overall structure of the tableware washing device 10 may be simpler, and better heat-exchange effect is achieved.

In some embodiments, one end of the heat-exchange pipeline 770 is connected to the first drainage pipeline 440 at a first position, the other end of the heat-exchange pipeline 770 is connected to the first drainage pipeline 440 at a second position. The first position is located upstream of the second position. The drainage pump 520 is arranged between the first position and the second position. The tableware washing device 10 further includes a first solenoid valve 810, a second solenoid valve 820 and a third solenoid valve 830. The first solenoid valve 810 is provided on the first drainage pipeline 440 and located upstream of the first position. The second solenoid valve 820 is provided on the first drainage pipeline 440 and located downstream of the second position. The third solenoid valve 830 is provided on the heat-exchange pipeline 770.

Specifically, during the water-injection stage before the cleaning process, the first solenoid valve 810 and the third solenoid valve 830 open, the second solenoid valve 820 closes, such that the current cleaning water is injected into the water collection cup 200 and introduced into the circulation loop. During the cleaning process, the first solenoid valve 810 and the second solenoid valve 820 close, the third solenoid valve 830 opens, the heat-exchange liquid is pumped by the drainage pump 520 to circulate in the circulation loop. After the cleaning process is completed, the first solenoid valve 810 and the second solenoid valve 820 open, such that the current cleaning water is discharged via the first drainage pipeline 440. The cleaning process may be the main washing process of the above-mentioned embodiments of the tableware washing device 10, which will not be repeated here.

In some embodiments, the tableware washing device 10 may further include a water reservoir 840. The water reservoir 840 is configured for storing the current cleaning water received from the water collection cup 200. The current cleaning water is used as the heat-exchange liquid in the circulation loop.

In some embodiments, the tableware washing device 10 may further include a fan 730. The fan 730 is arranged oppositely to the auxiliary heat exchanger 750. The fan 730 is configured to speed up the heat-exchange speed between the auxiliary heat exchanger 750 and the atmosphere air or liquid. In this way, the heat-exchange efficiency of the auxiliary heat exchanger 750 may be increased.

The above are just some implementations of the present disclosure, and do not limit the patent scope of the present disclosure. Any equivalent changes to the structure or processes of the description and drawings of the present disclosure or directly or indirectly used in other related technical field are included in the patent protection scope of the present disclosure.

What is claimed is:

1. A tableware washing device, comprising:
    an inner liner, configured to define a washing cavity for accommodating a tableware to be washed;
    a water collection cup, provided at a bottom of the inner liner, and configured to define a water collection cavity, wherein the water collection cavity is configured to collect washing water that flows from the washing cavity, the water collection cavity is communicated to the washing cavity via a first water supply pipeline, at least one of the water collection cup and the first water supply pipeline is provided with a washing pump, the washing pump is configured to pump the washing water in the water collection cavity to the washing cavity through the first water supply pipeline; and
    a heating apparatus, configured to selectively heat the washing water;
    wherein the heating apparatus comprises a semiconductor cooler configured to perform a primary heating on the washing water, wherein the semiconductor cooler comprises a refrigeration end and a heating end, the heating end is configured to heat the washing water, the tableware washing device further comprises:
    a heat-exchange pipeline;
    an auxiliary heat exchanger, and
    a heat-exchange pump, wherein the heat-exchange pipeline is connected to the refrigeration end, each of the auxiliary heat exchanger and the heat-exchange pump is provided on the heat-exchange pipeline, the heat-exchange pipeline forms a circulation loop, and a heat-exchange liquid is pumped by the heat-exchange pump to circulate in the circulation loop to perform heat exchange with the refrigeration end.

2. The tableware washing device as claimed in claim 1, wherein the heating apparatus further comprises an electric heater, the electric heater is provided downstream of the semiconductor cooler, and the electric heater is configured to perform a secondary heating on the washing water that has been heated by the semiconductor cooler.

3. The tableware washing device as claimed in claim 2, wherein a heating power of the semiconductor cooler is in a range of 40% to 60% of a total heating power of the semiconductor cooler and the electric heater.

4. The tableware washing device as claimed in claim 1, wherein the heating apparatus is provided on the water collection cup and/or the first water supply pipeline.

5. The tableware washing device as claimed in claim 1, wherein the semiconductor cooler comprises a refrigeration end and a heating end, the heating end is configured to heat the washing water, and the tableware washing device further comprises a fan arranged opposite to the refrigeration end.

6. A tableware washing device, comprising:
    an inner liner, configured to define a washing cavity for accommodating a tableware to be washed;
    a water collection cup, provided at a bottom of the inner liner, and configured to define a water collection cavity, wherein the water collection cavity is configured to collect washing water that flows from the washing cavity, the water collection cavity is communicated to the washing cavity via a first water supply pipeline, at least one of the water collection cup and the first water supply pipeline is provided with a washing pump, the washing pump is configured to pump the washing water in the water collection cavity to the washing cavity through the first water supply pipeline; and
    a heating apparatus, configured to selectively heat the washing water;
    wherein the heating apparatus comprises a semiconductor cooler configured to perform a primary heating on the washing water, wherein the semiconductor cooler comprises a refrigeration end and a heating end, the heating end is configured to heat the washing water, the tableware washing device further comprises:
    a heat-exchange pipeline connected to the refrigeration end, and
    an auxiliary heat exchanger arranged on the heat-exchange pipeline, wherein the heat-exchange pipeline and a first drainage pipeline form a circulation loop, the first drainage pipeline is communicated to the water collection cup, the washing water is used as a heat-exchange liquid, the heat-exchange liquid is pumped by a drainage pump on the first drainage pipeline to circulate in the circulation loop, and performs heat exchange with the refrigeration end.

7. The tableware washing device as claimed in claim 6, wherein a first end of the heat-exchange pipeline is connected to the first drainage pipeline at a first position, and a second end of the heat-exchange pipeline is connected to the first drainage pipeline at a second position, the first position is located upstream of the second position, the drainage pump is located between the first position and the second position, the tableware washing device further comprises a first solenoid valve, a second solenoid valve and a third solenoid valve, the first solenoid valve is provided on the first drainage pipeline and located upstream of the first position, the second solenoid valve is provided on the first drainage pipeline and located downstream of the second position, and the third solenoid valve is provided on the heat-exchange pipeline.

8. The tableware washing device as claimed in claim 7, wherein
during a water-injection stage before a cleaning process, the first solenoid valve and the third solenoid valve are configured to open, the second solenoid valve is configured to close, current cleaning water is injected into the water collection cup and introduced into the circulation loop;
during the cleaning process, the first solenoid valve and the second solenoid valve are configured to close, the third solenoid valve is configured to open, the drainage pump is configured to pump the heat-exchange liquid to circulate in the circulation loop; and
after the cleaning process is completed, the first solenoid valve and the second solenoid valve are configured to open, the current cleaning water is discharged via the first drainage pipeline.

9. The tableware washing device as claimed in claim 8, wherein the tableware washing device further comprises a water tank, the water tank is configured to define a first water storage cavity and a second water storage cavity, the water collection cup is communicated to the first water storage cavity via the first drainage pipeline; after the cleaning process is completed, the drainage pump is configured to pump the current cleaning water to the first water storage cavity via the first drainage pipeline, and the current cleaning water performs heat exchange with external fresh water in the second water storage cavity.

10. The tableware washing device as claimed in claim 9, wherein the first water storage cavity is communicated to the water collection cavity via a second water supply pipeline, the second water storage cavity is communicated to the water collection cavity via a third water supply pipeline; the third water supply pipeline is configured to introduce the external fresh water after the heat-exchange into the water collection cavity, and the external fresh water after the heat-exchange is used as current hot rinse water; after a hot rinse process is completed, the drainage pump is further configured to pump the current hot rinse water to the first water storage cavity, and the current hot rinse water is configured to be used as subsequent cleaning water or subsequent cold rinse water in a next washing process.

11. The tableware washing device as claimed in claim 9, wherein the water tank has an L shape, and covers at least a side wall and a top wall of the inner liner, and each of the first water storage cavity and the second water storage cavity has an L shape corresponding to the shape of the water tank.

* * * * *